Patented Aug. 20, 1935

UNITED STATES PATENT OFFICE 2,012,232

COMPOSITION OF MATTER AND PROCESS OF PRODUCING SAME

Emil Kline, Buffalo, and Henry W. Barlow, Kenmore, N. Y., assignors to Du Pont Rayon Company, New York, N. Y., a corporation of Delaware No Drawing. Application March 30, 1934, Serial No. 718,245

21 Claims. (Cl. 106—40)

This invention relates to a method of dispersing titanium dioxide and more specifically, it relates to the production of uniformly dispersed titanium dioxide in cellulosic solutions.

Titanium dioxide, which is now widely used to produce low luster and/or opaque filaments, threads, films, ribbons, straw or the like, is uniformly dispersed in viscose only with great difficulty. It is necessary in order to produce uniform products that the pigment be finely divided and uniformly dispersed throughout the cellulosic solution, and this is particularly true where the viscose is spun through fine orifices to form filaments to be used in the manufacture of artificial thread. This is possible only when each and every particle is wetted over its entire surface with the spinning solution. Inorganic pigments and specifically titanium dioxide are currently produced mainly for the paint and similar industries which do not require the extremely fine texture which is required of a delustrant. Consequently, these pigments contain agglomerates or tend to agglomerate or form aggregates so that the surface of many of the individual pigment particles is not properly wetted by the spinning solution. That is, an agglomeration may consist of a very large number of microscopic pigment-like particles held together by mutual attraction or otherwise resisting all ordinary mechanical action which attempts to break them down.

Various means and methods have been tried and used in the past to assist in the dispersing of $TiO_2$, but there are certain disadvantages resulting therefrom which have made it advisable for the art to seek more satisfactory means and methods.

An object of this invention is an efficient and thorough method for dispersing titanium dioxide in a cellulosic solution.

Another object of this invention is to produce higher quality pigmented and/or delustered threads and other formed structures from a cellulosic solution containing titanium dioxide.

A still further object of this invention is to thoroughly disperse a titanium dioxide pigment in a cellulosic spinning solution, thereby substantially eliminating agglomeration, reducing the time and energy consumed in the dispersing operation and economizing on the amount of pigment used, lessening the wear and tear on the pumps, spinnerets and other elements which tend to become abraded by agglomerated particles, and insuring the production of filaments and threads having uniform physical characteristics.

Other objects will be apparent from the description that follows.

Our invention resides in the discovery that sodium pyrophosphate in aqueous solution is an excellent peptizing or dispersing agent for titanium dioxide and dispersions can be prepared therewith which can be uniformly incorporated in cellulosic solutions such as viscose without deleteriously affecting in any way the usefulness of the solution. While improved dispersions of titanium dioxide can be prepared over a wide range of concentrations of sodium pyrophosphate, based on the weight of titanium dioxide used, we have found that exceptionally good results are obtained if the amount of sodium pyrophosphate used, based on the weight of the titanium dioxide, is from 0.2% to 0.7%, and preferably about 0.5% on the basis of the anhydrous salt.

To more clearly set forth and to illustrate our invention, we give below the following example.

Example

Sodium pyrophosphate is dissolved in water to form a 5% (by weight) solution calculated on the basis of the anhydrous salt. Two pounds of commercial titanium dioxide pigment are mixed with sufficient water containing two tenths of a pound of the sodium pyrophosphate solution to form ten pounds of titanium dioxide dispersion. The mixture is stirred in a well-baffled tank at high speed, e. g., 6,000–10,000 R. P. M. or higher, or is ground in a pebble mill or colloid mill, until a uniform dispersion is obtained. The entire dispersion is then incorporated into 4,000 pounds of viscose in the usual viscose mixer to form a pigmented viscose solution containing 0.05% titanium dioxide. Viscose solution so prepared can be used in the usual way without difficulty for the spinning of threads or casting of films or for the forming of other articles to produce dull and/or opaque products of high quality. It is to be understood, of course, that the quantity of pigment incorporated in the viscose may vary widely according to the cellulose concentration and the type of product to be produced. For instance, the quantity may be as low as .01% or as much as 2% or more, based on the weight of the viscose.

While we prefer, in a titanium oxide pigmented viscose, to use an amount of sodium pyrophosphate, based on the weight of the titanium dioxide, from about 0.2% to about 0.7%, very good dispersions have been obtained with as much as 10% sodium pyrophosphate (based on the weight of the anhydrous salt) calculated on the weight of the titanium dioxide dispersed.

When our preferred range of concentrations of sodium pyrophosphate is used, a good dispersion of titanium dioxide is obtained and we have found that such dispersions persist remarkably well even when allowed to stand for 18–20 hours, or more. Microscopic examinations of such dispersions clearly show that substantially all of the particles are separately wetted and are about one micron or less in diameter.

These dispersions can be conveniently incorporated in viscose at any stage in the preparation of the viscose without difficulty although for convenience they are preferably added to the viscose in the mixer after the cellulose xanthate is partly or completely dissolved. Pigmented viscose solutions prepared according to our invention can be filtered without any more difficulty than a normal viscose solution and can be readily spun through fine orifices into extremely fine filament yarn, such as one denier per filament, of unusually high quality.

When it is desirable to add other delustering and/or opaquing agents such as other inorganic pigments, organic solids or liquids, or oleaginous materials, for example, white mineral oil, to the cellulosic solution in combination with the titanium dioxide, such additions may be made separately and subsequent to the titanium dioxide addition or in combination with the titanium oxide in the event that such combination does not interfere with the TiO$_2$ dispersion. If, in addition to the titanium dioxide, one or more other inorganic pigments is to be added to the cellulosic solution, all the dry pigments may be mixed together and then dispersed. In this case, the optimum concentration of sodium pyrophosphate may vary somewhat from that given above for use with titanium dioxide alone.

While our invention is specifically concerned with the dispersing of titanium dioxide in viscose, it is applicable to other cellulosic solutions such as cuprammonium cellulose solutions, cellulose acetate solutions or solutions of other cellulose esters, or cellulose ether solutions.

Any modification of or variation from the above description and specific examples, which conforms to the spirit of the invention, is intended to be included within the scope of the claims.

We claim:

1. A cellulosic solution containing titanium oxide substantially uniformly distributed therethrough and having a dispersing agent comprising sodium pyrophosphate.

2. A viscose solution containing titanium oxide substantially uniformly distributed therethrough and having a dispersing agent comprising sodium pyrophosphate.

3. A viscose solution containing titanium oxide substantially uniformly distributed therethrough and having a dispersing agent comprising sodium pyrophosphate from a small fraction up to 10%, based on the weight of titanium oxide.

4. A viscose solution containing titanium oxide substantially uniformly distributed therethrough and having a dispersing agent comprising sodium pyrophosphate from 0.2% to 0.7%, based on the weight of titanium oxide.

5. A viscose solution containing titanium oxide substantially uniformly distributed therethrough and having a dispersing agent comprising about 0.5% sodium pyrophosphate, based on the weight of titanium oxide.

6. A cellulosic solution adapted for the spinning of filaments containing from 0.01% up to 2% titanium oxide substantially uniformly distributed therethrough and having a dispersing agent comprising sodium pyrophosphate.

7. A viscose solution adapted for the spinning of filaments containing from 0.01% up to 2% titanium oxide substantially uniformly distributed therethrough and having a dispersing agent comprising sodium pyrophosphate.

8. A viscose solution adapted for the spinning of filaments containing from 0.01% up to 2% titanium oxide substantially uniformly distributed therethrough and having a dispersing agent comprising sodium pyrophosphate, from a small fraction up to 10%, based on the weight of titanium oxide.

9. A viscose solution adapted for the spinning of filaments containing from 0.01% up to 2% titanium oxide substantially uniformly distributed therethrough and having a dispersing agent comprising sodium pyrophosphate, from 0.2% to 0.7%, based on the weight of titanium oxide.

10. A viscose solution adapted for the spinning of filaments containing from 0.01% up to 2% titanium oxide substantially uniformly distributed therethrough and having a dispersing agent comprising about 0.5% sodium pyrophosphate, based on the weight of titanium oxide.

11. The method which comprises dispersing titanium oxide in a cellulosic solution by the use of sodium pyrophosphate.

12. The method which comprises dispersing titanium oxide in viscose by the use of sodium pyrophosphate.

13. The method which comprises dispersing titanium oxide in viscose by the use of from a small fraction up to 10% sodium pyrophosphate, based on the weight of titanium oxide.

14. The method which comprises dispersing titanium oxide in viscose by the use of from 0.2% to 0.7% sodium pyrophosphate, based on the weight of titanium oxide.

15. The method which comprises dispersing titanium oxide in viscose by the use of about 0.5% sodium pyrophosphate based on the weight of titanium oxide.

16. A viscose solution containing titanium oxide substantially uniformly distributed therethrough and having a dispersing agent comprising sodium pyrophosphate and an oleaginous material.

17. A viscose solution containing titanium oxide substantially uniformly distributed therethrough and having a dispersing agent comprising sodium pyrophosphate and a mineral oil.

18. A viscose solution containing titanium oxide substantially uniformly distributed therethrough and having a dispersing agent comprising sodium pyrophosphate and white oil.

19. A viscose solution containing titanium oxide substantially uniformly distributed therethrough and having a dispersing agent comprising sodium pyrophosphate from a small fraction up to 10%, based on the weight of titanium oxide, said solution also containing white oil.

20. A viscose solution containing titanium oxide substantially uniformly distributed therethrough and having a dispersing agent comprising sodium pyrophosphate from 0.2% to 0.7%, based on the weight of titanium oxide, said solution also containing white oil.

21. A viscose solution containing titanium oxide substantially uniformly distributed therethrough and having a dispersing agent comprising about 0.5% sodium pyrophosphate, based on the weight of titanium oxide, said solution also containing white oil.

EMIL KLINE.
HENRY W. BARLOW.